United States Patent
Chi et al.

(10) Patent No.: US 12,457,182 B2
(45) Date of Patent: Oct. 28, 2025

(54) MERGING DATA FROM VARIOUS CONTENT DOMAINS TO TRAIN A MACHINE LEARNING MODEL TO GENERATE PREDICTIONS FOR A SPECIFIC CONTENT DOMAIN

(71) Applicant: Capital One Services, LLC, McLean, VA (US)

(72) Inventors: Alison Chi, McLean, VA (US); Cosette Goldstein, McLean, VA (US); Anirudha Simha, McLean, VA (US); Remel Tucker, McLean, VA (US); Nimesh Bernard, McLean, VA (US); Ricky Su, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 1055 days.

(21) Appl. No.: 17/342,732

(22) Filed: Jun. 9, 2021

(65) Prior Publication Data
US 2022/0400159 A1   Dec. 15, 2022

(51) Int. Cl.
*H04L 51/02*  (2022.01)
*G06N 3/04*  (2023.01)
*G06N 3/08*  (2023.01)

(52) U.S. Cl.
CPC ............ *H04L 51/02* (2013.01); *G06N 3/04* (2013.01); *G06N 3/08* (2013.01)

(58) Field of Classification Search
CPC ............ H04L 51/02; G06N 3/04; G06N 3/08
See application file for complete search history.

(56) References Cited

U.S. PATENT DOCUMENTS

| | | | |
|---|---|---|---|
| 2017/0178626 A1* | 6/2017 | Gruber | G06F 40/40 |
| 2018/0293235 A1* | 10/2018 | Ryger | G06F 16/93 |
| 2019/0129998 A1* | 5/2019 | Kataria | G06Q 10/1053 |
| 2019/0205964 A1* | 7/2019 | Onoro Rubio | G06N 3/084 |
| 2020/0226212 A1* | 7/2020 | Tan | G06F 18/214 |
| 2021/0027178 A1* | 1/2021 | Ding | G06F 16/9535 |
| 2021/0081503 A1* | 3/2021 | Tran | G06N 3/08 |
| 2021/0141799 A1* | 5/2021 | Steedman Henderson | G06N 3/045 |

OTHER PUBLICATIONS

Liu, H., & Kešelj, V. (Jul. 2006). Combined mining of Web server logs and web contents for classifying user navigation patterns and predicting users' future requests. Data & Knowledge Engineering, 61(2), 304-330. (Year: 2006).*

\* cited by examiner

*Primary Examiner* — Michael J Huntley
*Assistant Examiner* — Maggie Thanh Maido
(74) *Attorney, Agent, or Firm* — Foley & Lardner LLP

(57) ABSTRACT

Methods and systems are described herein for merging datasets from multiple content domains for training a prediction model to predict a solution for a request related to a specific content domain. A dataset for a content domain may include requests and solutions organized as groups. For example, a dataset for a first content domain may include a first group having (a) a first set of requests (e.g., questions or queries) related to a first topic, and (h) a solution (e.g., an answer) associated with the first set of requests. The datasets of different content domains are analyzed based on context-based vector representations of the requests or solutions to determine the groups that are similar and merge those similar groups into a single merged group. A prediction model is trained with the merged groups for obtaining a prediction of a solution to any given request.

20 Claims, 7 Drawing Sheets

MERGING DATA FROM VARIOUS CONTENT DOMAINS TO TRAIN A MACHINE LEARNING MODEL TO GENERATE PREDICTIONS FOR A SPECIFIC CONTENT DOMAIN

BACKGROUND

In recent years, applications are using chatbots to resolve any queries, questions, or requests users may have. The chatbots may be used for answering questions in various content domains (e.g., a product or service related area such as automobiles, smart phones, credit cards, debit cards, mobile service bill, credit card bill, or content related to various teams within an organization). In some cases, a solution (e.g., answer) presented by these chatbots may be less accurate or relevant to a request posted by the user. The lack of data in a particular content domain may impact an accuracy or relevance of a prediction by the chatbot. The architecture of current chatbots may not be capable of leveraging data of multiple content domains to improve the prediction for a specific content domain. These and other drawbacks exist.

SUMMARY

Methods and systems are described herein for an improved computer architecture in networked computer systems that overcome the lack of data in a specific content domain by merging data from multiple content domains for training a prediction model to predict a solution for a request related to the specific content domain. For example, applications (e.g., chatbots) are increasingly using artificial intelligence (AI)-based models for resolving user queries or requests automatically. The AI-based models are typically trained using data available in a specific content domain for predicting solutions (e.g., resolving) user requests related to the specific content domain. For example, to predict solutions for user requests related to a first content domain (e.g., content associated with a first team in an organization, a first product, or a service), an AI-based model may be trained using training data (e.g., requests and solutions) available for the first content domain. Similarly, to predict solutions for user requests related to a second content domain (e.g., content associated with a second team in an organization, a second product, or a service), the AI-based model may be trained using the training data available for the second content domain. When a new user request is received, the trained AI-based model may generate a prediction for the new user request. Conventional AI-based models, however, are prone to inaccurate predictions. For example, when the training data available for a specific content domain is limited, a likelihood that a new user request (e, g., for which a prediction is to be generated) is not similar to the requests from the trained data is high and therefore, a prediction generated for such a request may be inaccurate or irrelevant to the new user request. In some scenarios (e.g., if the user request is related to how to operate a specific computer system in a network), inaccurate predictions (e.g., inaccurate solutions) may adversely affect the operation of a system (e.g., a failure of any one program may have system-wide effects such as system errors and crashes).

Accordingly, to overcome these technical problems with respect to conventional AI-based models, methods and systems are described herein for an improved prediction architecture in networked computer systems. In particular, methods and systems are described herein for merging training data from multiple content domains for training a prediction model to generate predictions for a specific content domain. However, training data that is available for one domain cannot simply be substituted for another domain. The training data for each content domain may include requests and solutions that are specific to a domain. For example, the training data for a first content domain may include a first group having a first set of requests (e.g., questions or queries) related to a first topic and a solution (e.g., an answer) associated with the first set of requests, a second group may include a second set of requests related to a second topic and a solution associated with the second set of requests, and so on.

Training models on incorrect training data (or training data fora different domain) may lead to models that are less accurate in their own domain, which defeats the purpose of using the training data from other domains. The methods and systems overcome this limitation by performing preprocessing steps on the training data to identify suitable training data from other domains. To do so, the computer system analyzes the training data from different content domains to determine the groups that are similar and merges the similar groups into a single merged group. For example, the computer system may merge a first group from the first content domain with a third group from the second content domain that is determined to be similar to the first group to generate a merged group, which includes all the requests and solutions from the first group and the third group. Various such merged groups may be formed.

However, identifying similar data presents its own unique challenges. First off, the methods and systems must identify specific similarities in the data, which may differ based on both the domain that is receiving the extra training data and the domain that is providing the extra training data. Accordingly, the computer system may determine the similar groups based on merging criteria. The merging criteria may be defined using a number of parameters, which may be selected based on characteristics of one or more domains. In some embodiments, the merging criteria may be defined based on a relationship (e.g., distance) between vector representations of requests or solutions of two groups.

As yet another technical hurdle, after merging criteria are selected, the methods and systems require a mechanism for applying this merging criteria. The methods and systems may use vector representations that may be generated using any of a number of ways. In some embodiments, a prediction model that is pre-trained using a wide variety of content (e.g., corpora of data available from the Internet) to generate semantically meaningful vector representations for requests and solutions may be used. For example, a pre-trained prediction model such as sentence Bidirectional Encoder Representations from Transformers (SBERT), which generate vector representations based on the learned context of words, word-parts, or phrases may be used. The vector representations of the requests and solutions are then used in determining the similar groups to be merged. For example, the merging criteria may indicate that a first group is to be merged with a second group based on a vector representation of a request in the first group being within a radius of vector representations of requests in the second group. In another example, the merging criteria may indicate that a first group is to be merged with a second group based on a first similarity score that is indicative of a match or similarity between a first vector representation of a first request in the first group and a second vector representation of a second request in the second group satisfying a first threshold score. In another example, the merging criteria may indicate that a first group is to be merged with a second group based on a second similarity score that is indicative of a match or similarity between a first vector representation of a first solution in the first group and a second vector representation of a second solution in the second group satisfying a second threshold score. The similarity between two vector representations may be determined using any of a number of methods (e.g., cosine distance, Euclidean distance, Manhattan distance, or another method).

After merging the groups of various content domains based on the merging criteria, the prediction model may be trained with the merged groups to "fine-tune" the pre-trained prediction model to generate vector representations based on the context learned from the requests and solutions of the various content domains. Since a merged group indicates that the requests or solutions within the merged group are determined to be similar, the process of fine tuning the prediction model configures (e.g., adjust weights and biases) the prediction model to generate similar vector representations for requests or solutions within a merged group. For example, if the vector representations are numerical values, then the vector representations of a first request and a second request within the merged group are generated such that they do not vary beyond a specified threshold. Consequently, the fine-tuning of the prediction model with the merged data enables the prediction model to be used for finding similarity between a given request (e.g., a request for which a prediction is to be generated) and requests within a content domain or across content domains based on the context learnt from the various content domains, not just a particular content domain. This can result in a more accurate prediction of the solution to a user request.

The fine-tuned prediction model may be used for generating predictions for new user requests. When a new user request is received (e.g., via a messaging interface), the user request is input to the prediction model to obtain a prediction of a solution to the user request. For example, the fine-tuned prediction model generates a vector representation of the user request, which is compared with vector representations of requests stored in a data storage system to determine similarity scores and identify a request having a vector representation whose similarity score satisfies a threshold. A solution associated with the identified request is obtained and presented to the user (e.g., via the messaging interface) response to the user request. In some embodiments, the computer system may obtain a specified number of requests with similarity scores satisfying a threshold (e.g., top three requests) and present them for user selection. Upon receiving a user selection of a request, a solution associated with the selected request is obtained and presented to the user. In some embodiments, the questions presented for user selection may be chosen from the content domain with which the user request is associated.

Accordingly, as described above, by merging the requests and solutions from various content domains for training the prediction model, the prediction model may be used to identify similar requests within a content domain or across content domains, and consequently a solution to the request, with an improved accuracy, which addresses one or more of the technical problems and hurdles discussed above.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form to avoid unnecessarily obscuring the embodiments of the invention.

Figure 1:
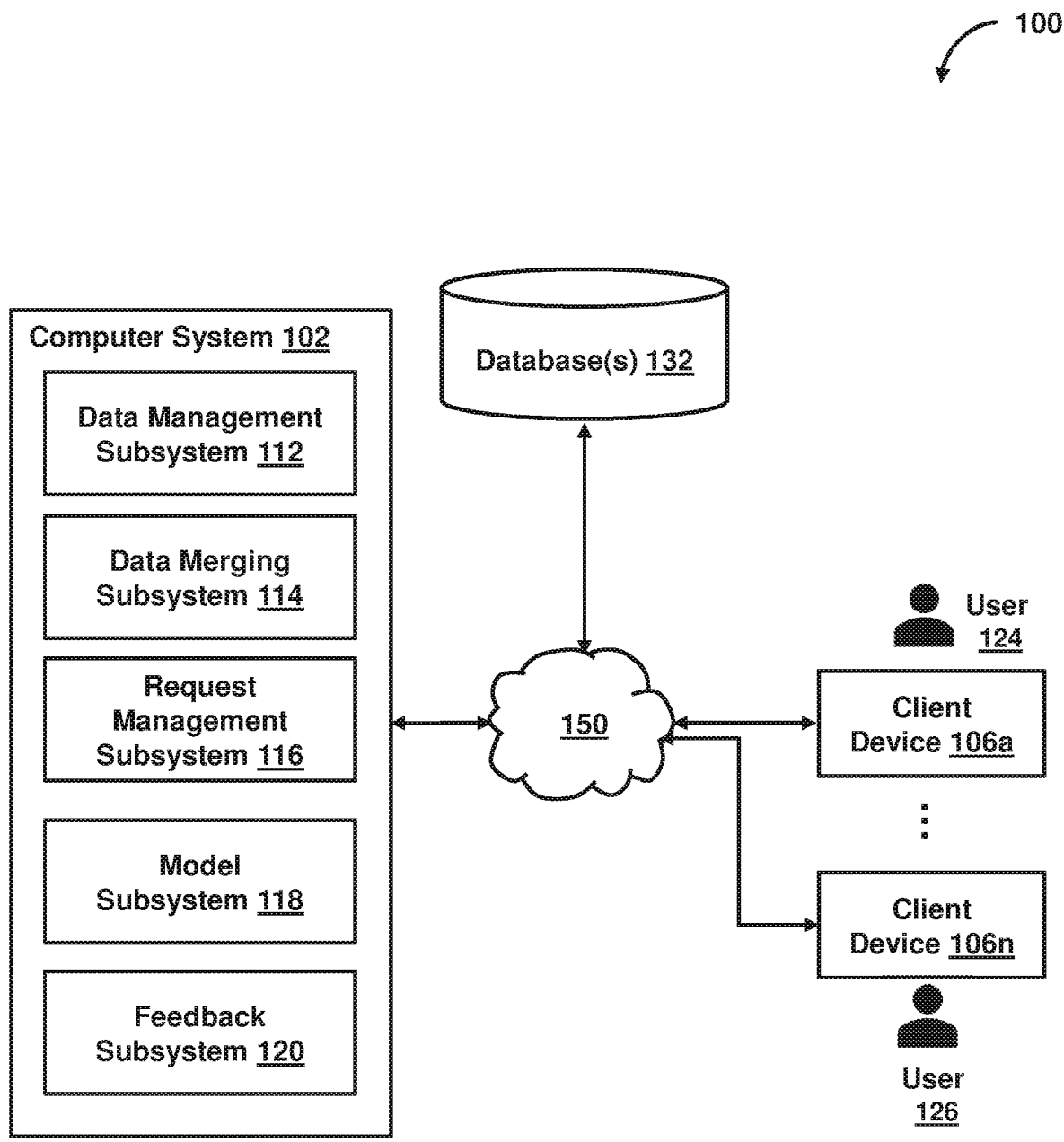
FIG. 1 shows a system for facilitating prediction of a solution to a user request, in accordance with one or more embodiments.

FIG. 1 shows a system 100 for facilitating prediction of a solution to a user request, in accordance with one or more embodiments. For example, system 100 may comprise an improved processing architecture in networked computer systems. In particular, system 100 may include a new function routine that merges training data from various content domains for training a prediction model to predict a solution for a request related to a specific content domain. As shown in FIG. 1, system 100 may include computer system 102, client device 106 (or client device 106a-106n), or other components. By the way of example, computer system 102 may include any computing device, such as a personal computer (PC), a laptop computer, a tablet computer, a hand-held computer, other computer equipment. Computer system 102 may include data management subsystem 112, data merging subsystem 114, request management subsystem 116, model subsystem 118, feedback subsystem 120, or other components. Each client device 106 (e.g., (106a, 106n) may include any type of mobile terminal, fixed terminal, or other device. By way of example, client device 106 may include a desktop computer, a notebook computer, a tablet computer, a smartphone, a wearable device, or other client device. Users may, for instance, utilize one or more client devices 106 to interact with one another, one or more servers, or other components of system 100.

A component of system 100 may communicate with one or more components of system 100 via a communication network 150 (e.g., Internet, mobile phone network, a mobile voice or data network, a cable network, a public switched telephone network, or other types of communications network or combinations of communications networks). The communication network 150 may be a wireless or wired network. As an example, the client device 106a may interact with the computer system 102 via the above described communication network. As another example, the client device 106 and the computer system 102 may communicate wirelessly.

It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device 106.

It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

In some embodiments, system 100 facilitates resolution of a user request (e.g., a question or query) by predicting a solution (e.g., an answer) to the user request. The system 100 facilitates overcoming the lack of data in a specific content domain by merging data from various content domains and training a prediction model using the merged data to generate predictions for the specific content domain. The training data is prepared by obtaining requests and solutions from various content domains and merging similar requests and solutions based on merging criteria into merged groups. A content domain may be related to a specific domain, category, product, service or content associated with a team in an organization. The training data for a content domain may include requests and solutions organized as groups. For example, the training data for a first content domain may include a first set of groups in which (a) a first group may include a first set of requests (e.g., questions or queries) related to a first topic and a solution (e.g., an answer) associated with the first set of requests, (b) a second group may include a second set of requests related to a second topic and a solution associated with the second set of requests, and so on. For example, the first group may include requests such as "Where can I find the user manual for code library A?," "Where is the user manual for library A?," or "Where is the user manual of code library A stored?" or so on. The solution in the first group may be an answer to the above requests such as "Please find the user manual at <URL>." Similarly, the training data for other content domains may include groups of requests and solutions related to the respective content domains.

The groups may be merged based on relationships between context-based vector representations of the requests or solutions. A context-based vector representation is representative of a context of words, word-parts or phrases within a corpus of content. A context-based vector representation may be generated for each request and solution using any of a number of text encoders. For example, a first prediction model (also referred to as "domain-independent prediction model"), which is a pre-trained prediction model, such as SBERT, may be used to generate the vector representations. The pre-trained prediction model may be trained using a wide variety of content (e.g., corpora of textual content available from the Internet, such as Wikipedia, books, or other such content) so that the vector representations generated by them are a representation of their context within the English language, not just within a content domain's dataset. The vector representations of the requests and solutions are then analyzed to merge the groups based on the merging criteria. For example, a first group from a first content domain may be merged with a second group from a second content domain based on (a) a vector representation of a request in the first group being within a radius of vector representations of requests in the second group, (b) a first similarity score that is indicative of a match between a first vector representation of a first request in the first group and a second vector representation of a second request in the second group satisfying a first threshold score, and/or (c) a second similarity score that is indicative of a match between a first vector representation of a first solution in the first group and a second vector representation of a second solution in the second group satisfying a second threshold score. The similarity between two vector representations may be determined using any of a number of methods (e.g., cosine distance, Euclidean distance, Manhattan distance, or another method). The merging process may generate a number of merged groups. For example, a merged group may include all requests and a solution from the first group and all requests and a solution from the second group which is merged with the first group. The merged group may indicate that all requests and solutions within the merged group are semantically similar.

In some embodiments, system 100 may perform other operations on the merged groups to prepare the training data. For example, system 100 may perform data augmentation to augment a merged group with an additional request or solution (e.g., that match with, or is similar in context/meaning to, the request or solutions in the merged group). In some embodiments, the data augmentation operation may generate a new request or solution by (a) replacing one or more words in an existing request with synonyms, (b) removing one or more words from an existing request, (c) adding one or more synonyms to an existing request, or other such operations. System 100 may perform the data augmentation based on augmentation criteria. For example, augmentation criteria may indicate the augmentation is to be performed if a number of requests or solutions is below a specified threshold.

System 100 may obtain the merged groups and input them as training data to the first prediction model to generate prediction data related to vector representations of the requests based on the context of words, word-parts, or phrases learnt from the datasets of content domains. Since the merged groups identify similar requests and solutions across content domains, the first prediction model learns to generate similar vector representations for requests or solutions within a merged group. As an example, the training data may include a first request and a second request from a first merged group, or other such parameters. The first prediction model may generate prediction data related to vector representations of the first and second requests. In some embodiments, actual information such as whether the first request and the second request are similar may be provided as reference feedback to the prediction model. As an example, the reference feedback may indicate a group identification (ID) of the group to which the requests belong and a same group ID indicates that the requests are similar. The first prediction model may update one or more portions of the first prediction model based on the prediction data and the reference feedback information. In this way, for example, the first prediction model may be trained or configured to generate vector representations of a request.

As such, in some embodiments, subsequent to the updating of the first prediction model, system 100 may use the first prediction model to obtain a solution to a given user request. For example, upon receiving a user request (e.g., via a messaging interface), the system 100 may provide the user request as an input to the first prediction model, which generates prediction data related to a vector representation of the user request. The system 100 may then compare the vector representation of the user request with vector representations of the requests stored in a data storage system (e.g., database 132) and identify a request whose similarity score satisfies a threshold. The system 100 may obtain a solution associated with the matching request and present the solution to the user (e.g., via the messaging interface). In some embodiments, the system 100 may obtain a specified number of requests with similarity scores satisfying a threshold (e.g., top three requests) and present them for user selection. Upon receiving a user selection of a request, a solution associated with the selected request is obtained and presented to the user. In some embodiments, the requests presented for user selection may be chosen from the content domain with which the user request is associated.

In some embodiments, the system 100 may train a domain-specific prediction model to generate predictions for a specific content domain. That is, if there are "10" content domains, the system 100 may train "10" domain-specific prediction models in which each prediction model generates a prediction of a solution for the respective content domain. For example, the system 100 may train a prediction model for a first content domain using a first dataset having groups of requests and solutions associated with the first content domain. The training process may include generating first vector representations of each request in the first data set and a second vector representation of a solution in the first dataset. The vector representations may be generated based on frequency of occurrence of a term in a request relative to the frequency of occurrence in the entire first dataset. For example, the vector representations may be numerical weights that are generated using term frequency-inverse document frequency (TF-IDF) method. A vector representation of the request and a solution associated with the request for each request in the first dataset is input to the domain-specific prediction model as the training data. The domain-specific prediction model may generate prediction data based on the above training information. For example, the prediction data may include a solution to a request. In some embodiments, actual information such as the solution to the request may be provided as reference feedback to the prediction model. As an example, the reference feedback may indicate a solution associated with the request. The domain-specific prediction model may update one or more portions of the domain-specific prediction model based on the prediction data and the reference feedback information. In this way, for example, the domain-specific prediction model may be trained or configured to generate a solution for a given request.

As such, in some embodiments, subsequent to the updating of the domain-specific prediction model, system 100 may use the domain-specific prediction model to predict a solution for a user request. As an example, system 100 may obtain a new user request (e.g., via a messaging interface) from a user, generate a frequency-based vector representation for the user request, determine the content domain with which the user request is associated, and provide the vector representation of the user request as an input to the domain-specific prediction model associated with the content domain to obtain prediction data related to a solution to the user request. In some embodiments, the prediction may be associated with a confidence score, and the solution may be presented to the user based on the confidence score satisfying a threshold score.

In some embodiments, the system 100 may use a domain-specific prediction model first to obtain the solution for a user request, and use the domain-independent prediction model (e.g., the first prediction model) if the domain-specific prediction model is unable to provide a prediction of the solution.

In some embodiments, the system 100 may determine whether a user input received from a user (e.g., via a messaging interface) is indicative of a request and provide the user input to the domain-specific prediction model or the domain-independent prediction model based on the user input being indicative of a request. For example, a messaging interface allows users to interact with one another via messages. A first user, e.g., user 124, may post a message for a second user, e.g., user 126, in the messaging interface to which the second user may respond. In some embodiments, the user input received in the messaging interface may be a conversation/statement between two users and not a request (e.g., a question) in which case the system 100 may avoid executing the prediction model to obtain the solution. If the user input is a request, the system 100 may automatically obtain the solution from the domain-specific prediction model or the domain-independent prediction model. In some embodiments, system 100 may use a third prediction model to determine whether a user input (e.g., received via the messaging interface) is indicative of a request.

In some embodiments, the system 100 may train the third prediction model to determine whether textual data (e.g., one or more words) is a request. System 100 may obtain textual data from the data storage system and input them as training information to a third prediction model to generate prediction data related to a classification of the text (e.g., request or statement). As an example, the training information may include messages exchanged between users or posted by the users in the messaging interface, or other such textual data. The third prediction model may generate prediction data related to the classification based on the above training information. For example, the prediction data may include a classification indicating the textual data is a statement. In some embodiments, actual information such as whether the textual data in the training information is a statement or request may be provided as reference feedback to the third prediction model. As an example, the reference feedback may indicate that the textual data is a request. The third prediction model may update one or more portions of the third prediction model based on the prediction data and the reference feedback information. In this way, for example, the third prediction model may be trained or configured to generate a prediction related to classification of a user input.

As such, in some embodiments, subsequent to the updating of the third prediction model, system 100 may use the third prediction model to classify a user input as a statement or a request. As an example, system 100 may obtain a user input (e.g., via a messaging interface) and provide that as input to the third prediction model to obtain a classification of the user input as a statement or a request.

In some embodiments, a prediction model may include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal surpasses the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

Figure 2:
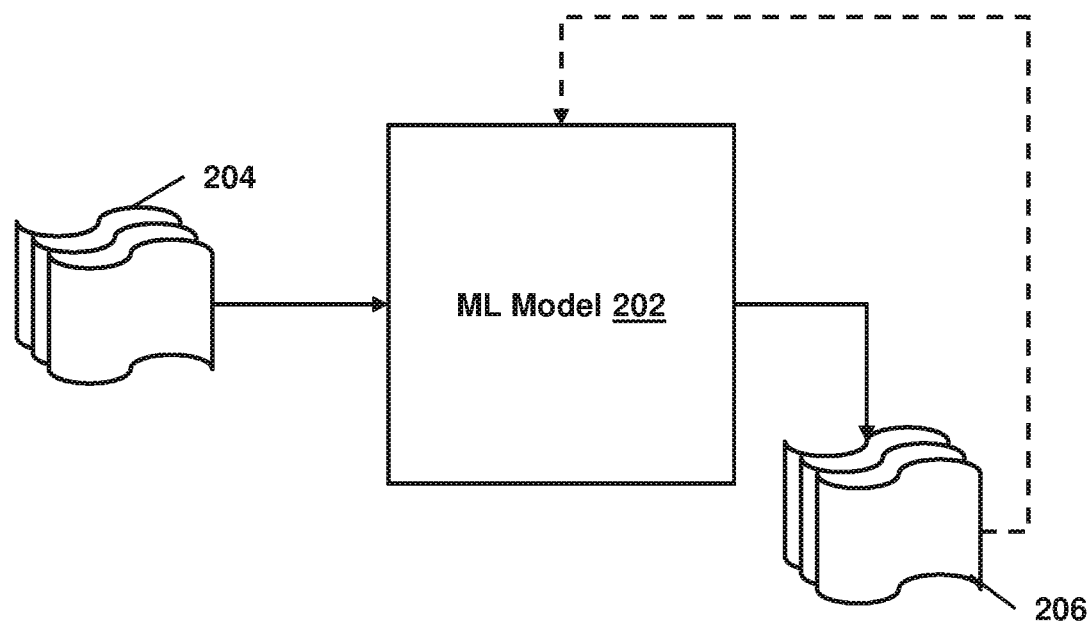
FIG. 2 shows a machine learning model configured to facilitate prediction of a solution to a user request, in accordance with one or more embodiments.

As an example, with respect to FIG. 2, machine learning model 202 may take inputs 204 and provide outputs 206. In one use case, outputs 206 may be fed back to machine learning model 202 as input to train machine learning model 202 (e.g., alone or in conjunction with user indications of the accuracy of outputs 206, labels associated with the inputs, or with other reference feedback information). In another use case, machine learning model 202 may update its configurations (e.g., weights, biases, or other parameters) based on its assessment of its prediction (e.g., outputs 206) and reference feedback information (e.g., user indication of accuracy, reference labels, or other information). In another use case, where machine learning model 202 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 202 may be trained to generate better predictions.

Subsystems 112-120

Figure 3:
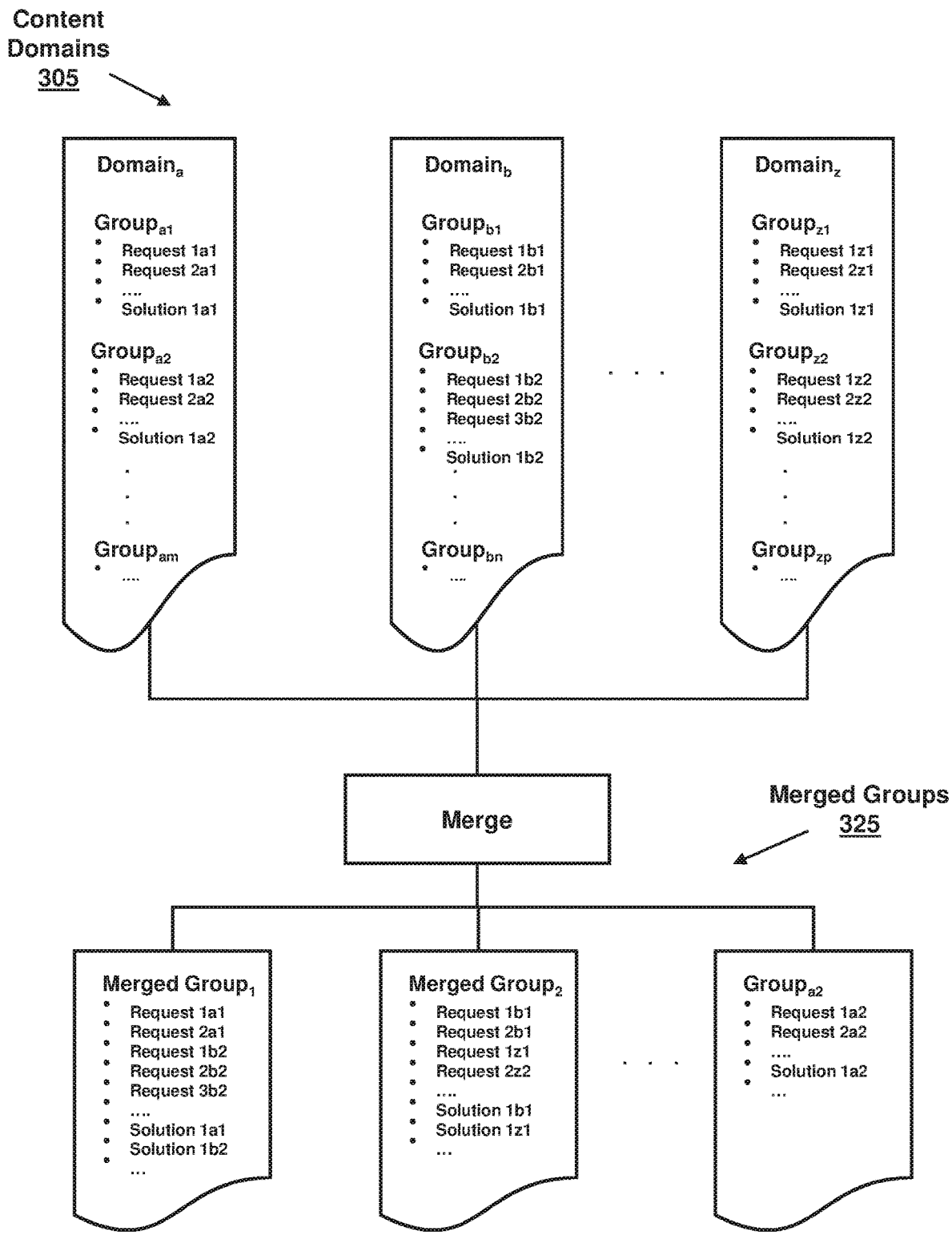
FIG. 3 is a block diagram illustrating datasets of various content domains, in accordance with one or more embodiments.

In some embodiments, data management subsystem 112 facilitates managing a dataset associated with a content domain. As an example, the data management subsystem 112 may provide a graphical user interface (GUI) to define requests and solutions for a content domain. FIG. 3 is a block diagram illustrating datasets of various content domains 305, in accordance with one or more embodiments. A user (e.g., an administrator of an application, or other entity) associated with a first content domain, "Domain$_a$," may access the GUI to input requests and solutions associated with the first content domain. The first dataset may include multiple groups of requests and solutions, such as "Group$_{a1}$," "Group$_{a2}$," "Group$_{a3}$," and so on in which each group is related to a specific aspect, topic or another characteristic of the first content domain. A group may include a set of requests (e.g., questions), such as, "Request1$_{a1}$," "Request2$_{a1}$," "Request3$_{a1}$," etc. associated with the specific aspect, and a solution, such as "Solution1$_{a1}$," associated with the set of requests. The datasets for other content domains (e.g., "Domain$_b$," "Domain$_c$," etc.) may be created in a similar way or other ways. The data management subsystem 112 associates each domain, group, request, and solution with a unique identifier (ID). The data management subsystem 112 may store the datasets in any of a number of formats. For example, the data management subsystem 112 may store the datasets as a file in the database 132. Note that the groups may be organized in different ways. In some embodiments, the groups may be associated with an ID that increases monotonically across content domains 305. For example, if the first content domain has five groups and the second content domain has three groups, the groups in the first content domain may have IDs "1"-"5" and the groups in the second content domain may have IDs "6"-"8."

Examples of requests in the first group, "Group$_{a1}$," may include "What should I cook after work?", "What are some one-pot meals I can cook?," "What are some easy recipes to make." Example of a solution for the requests in the first group may include "For easy one-pot or weeknight recipes, please access this [link]" where the link may be a uniform resource locator (URL) of a location that has content related to the solution.

The data merging subsystem 114 obtains the datasets of the content domains 305 and merges the groups that are similar to generate merged groups 325. The data merging subsystem 114 determines the groups to be merged based on merging criteria. The merging criteria may be defined using a number of parameters. In some embodiments, the merging criteria may be defined based on a relationship (e.g., distance) between context-based vector representations of requests or solutions of two groups. A context-based vector representation is representative of a context of words, word-parts or phrases of a request or solution within a corpus of content. A context-based vector representation may be generated for a request or solution using any of a number of text encoders. For example, the data merging subsystem 114 may use a first prediction model (also referred to as "domain-independent prediction model"), which is a pre-trained prediction model, such as SBERT, to generate a vector representation for a request or a solution. The pre-trained prediction model may be trained using a wide variety of content (e.g., corpora of textual content available from the Internet, such as Wikipedia, books, or other such content) so that a vector representation generated by the pre-trained model for a given word or words is a representation of a context of the given word or words within the English language, not just within a content domain's dataset. The data merging subsystem 114 may input the datasets of the content domains 305 to the first prediction model to obtain vector representations of the requests and solutions. In some embodiments, a vector representation is an array of numerical values.

The vector representations of the requests and solutions may be analyzed to merge the groups based on the merging criteria. For example, the merging criteria may indicate that a first group from a first content domain may be merged with a second group from a second content domain based on a vector representation of a request in the first group being within a radius of vector representations of requests in the second group. The radius of a group may be determined as a distance (e.g., cosine distance) between a centroid of the group and the request that is closest to the centroid. For example, the data merging subsystem 114 may determine a centroid (e.g., mean) of the vector representations of the second group, and determine a vector representation of a request within the second group that is closest to the centroid (e.g., using cosine distance). The distance (e.g., cosine distance) between the vector representation of the closest request and the centroid is determined as the radius. The data merging subsystem 114 may then determine whether any the other group (e.g., the first group) has a request whose vector representation is closer to the centroid than the closest request in the second group (that is, a distance between the request of the first group and the centroid is lesser than the radius). If there is any request within the radius of the second group, the data merging subsystem 114 may merge the two groups. For example, the data merging subsystem 114 may determine a request in the first group, "$Group_{a1}$," of the first content domain is within the radius of the second group, "$Group_{b2}$," of the second content domain, and accordingly merge the first group, "$Group_{a1}$," of the first content domain, "$Domain_a$," with the second group, "$Group_{b2}$," of the second content domain, "$Domain_b$" as indicated in a first merged group, "Merged $Group_1$," of the merged groups 325 illustrated in FIG. 3. A merged group includes all requests and solutions from the two groups that are merged. A merged group is identified using a unique ID. The requests in a merged group may be considered to be similar to one another.

In another example, the merging criteria may indicate that a first group from a first content domain may be merged with a second group from a second content domain based on a first similarity score that is indicative of a similarity or match between a first vector representation of a first request in the first group and a second vector representation of a second request in the second group satisfying a first threshold score. For example, the data merging subsystem 114 may determine a similarity score that is indicative of a match or similarity between a vector representation of each request in the first group, "$Group_{a1}$," of the first content domain and a vector representation of each request in the second group, "$Group_{b2}$," of the second content domain (e.g., using cosine distance). If any of the similarity scores satisfies a threshold score (e.g., greater than 90%), then the first group and the second group are merged.

In another example, the merging criteria may indicate that a first group from a first content domain may be merged with a second group from a second content domain based on a second similarity score that is indicative of a match between a first vector representation of a first solution in the first group and a second vector representation of a second solution in the second group satisfying a second threshold score. For example, the data merging subsystem 114 may determine a similarity score that is indicative of a match or similarity between a vector representation of a solution in the first group, "$Group_{a1}$," of the first content domain and vector representation of the solution in the second group, "$Group_{b2}$," of the second content domain using cosine distance). If the similarity score satisfies a threshold score (e.g., greater than 90%), then the first group and the second group are merged.

The data merging subsystem 114 may generate a number of merged groups 325 as illustrated in FIG. 3. However, the merged groups 325 may also include groups that are not merged. For example, the group, "$Group_{a2}$," in the merged groups 325, which is a group from the first content domain, is not merged with any other groups as it did not satisfy the merging criteria.

In some embodiments, the data merging subsystem 114 may also perform other operations on the merged groups. For example, the data merging subsystem 114 may perform data augmentation to augment a merged group with an additional request or solution. In some embodiments, the data augmentation operation may generate a new request or solution by (a) replacing one or more words in an existing request with synonyms, (b) removing one or more words from an existing request, (c) adding one or more synonyms to an existing request, (d) swapping words in a request, or other such operations. For example, the first merged group may include requests such as (i) "Do you have advice on how to get started with cooking?" (ii) "How do I substitute things in recipes if I don't have the right ingredients?" (iii) "How do I learn how to cook?" and (iv) "I want to make this recipe but I don't have everything." The data augmentation process may add an additional request such as "you have advice on how to get started with cooking?" obtained by deletion of words from request (i). The data augmentation process may add an additional request such as "How do I substitute items in recipes if I don't have the right ingredients?" by replacement of synonym in request (ii). The data augmentation process may add an additional request such as "Do you have cooking on how to get started with advice?" by swapping words of request (i). Similar data augmentation operations may be performed on the solutions.

In some embodiments, the data merging subsystem 114 may perform the data augmentation based on augmentation criteria. For example, augmentation criteria may indicate the data augmentation is to be performed if a number of requests or solutions in a merged group is below a specified threshold (e.g., less than 10). In some embodiments, the data augmentation is performed to provide additional context information for fine tuning the first prediction model in generating vector representations more accurately.

The merged groups 325 may be used to fine tune the first prediction model to generate prediction data related to a vector representation of any given request based on the context of words, word-parts, or phrases learnt from the datasets of content domains. Since the merged groups identify similar requests and solutions across content domains, the first prediction model learns to generate similar vector representations for requests or solutions within a merged group. The model subsystem 118 may obtain the merged groups 325 as training data and input them to the first prediction model to generate prediction data related to a vector representation of the requests and solutions based on the training data. As an example, the training data may include a first request and a second request from a first merged group, or other such parameters. Such information may be stored in the database 132. The first prediction model may generate prediction data related to vector representations of the first and second requests. Feedback subsystem 120 may provide actual information such as whether the first request and the second request are similar as reference feedback to the prediction model. As an example, the reference feedback may indicate a group identification (ID) of the group to which the requests belong and a same group ID indicates that the requests are similar. The model subsystem 118 may update one or more portions of the first prediction model based on the prediction data and the reference feedback information. In this way, for example, the first prediction model may be trained, fine-tuned, or configured to generate vector representations of a request.

As such, in some embodiments, subsequent to fine-tuning the first prediction model, the first prediction model may be used to obtain a prediction of a solution for a given user request.

In some embodiments, the request management subsystem 116 may receive a user request for which a prediction of a solution is to be obtained. The request management subsystem 116 may be associated with an application, such as a chatbot or another application in which a user (e.g., user 124) may input a user request. For example, the request management subsystem 116 may receive a user request via a messaging interface that is used by a user to exchange messages with another user or another entity. The request management subsystem 116 may provide the user request as an input to the first prediction model (e.g., fine-tuned), which generates prediction data related to a vector representation of the user request. The request management subsystem 116 may then compare the vector representation of the user request with vector representations of the requests stored in the database 132 (e.g., requests of the content domains 305) and identify a request whose similarity score satisfies a threshold (e.g., greater than 90% or another threshold). The request management subsystem 116 may then obtain a solution associated with the matching request and present the solution to the user (e.g., via the messaging interface). For example, the request management subsystem 116 may determine that a request "$R1_{a2}$," from "$Group_{a2}$," matches the user request, and accordingly, the request management subsystem 116 obtains the solution associated with the group, "$Group_{a2}$," and presents the solution to the user in response the user request (e.g., via the messaging interface).

In some embodiments, the request management subsystem 116 may obtain a specified number of requests with similarity scores satisfying a threshold (e.g., top three requests) and present them for user selection. Upon receiving a user selection of a request, a solution associated with the selected request is obtained and presented to the user. Further, in some embodiments, the request management subsystem 116 may select the requests presented for user selection from a content domain with which the user request is associated. In some embodiments, the content domain associated with the user request may be indicated by the messaging interface or another application from which the user may input the user request. For example, if the user request is associated with the first content domain, "$Domain_a$," then the request management subsystem 116 may select the matching requests (e.g., top three requests) for presentation to the user from the groups of the first content domain.

In some embodiments, a domain-specific prediction model may be used to generate predictions for requests from a specific content domain. For example, a first domain-specific prediction model may be used to generate predictions for requests from a first content domain, and a second domain-specific prediction model may be used to generate predictions for requests from a second content domain. A domain-specific prediction model may be trained using a dataset associated with a specific content domain. For example, the first domain-specific prediction model may be trained using a first dataset having groups of requests and solutions associated with the first content domain. The data management subsystem 112 generates a vector representation based on a frequency of occurrence of a term in a request relative to the frequency of occurrence of the term in the entire first dataset. For example, the vector representations may be generated using a TF-IDF method, or another method. The model subsystem 118 may provide the vector representations of the requests as training information to the domain-specific prediction model. The domain-specific prediction model may generate prediction data based on the above training information. For example, the prediction data may include a solution to a request. Feedback subsystem 120 may provide actual information such as a solution to the request as reference feedback to the prediction model. The model subsystem 118 may update one or more portions of the domain-specific prediction model based on the prediction data and the reference feedback information. In this way, for example, the domain-specific prediction model may be trained or configured to generate a solution for a given request. Various such domain-specific models may be trained for corresponding content domains. As such, in some embodiments, subsequent to the updating of the domain-specific prediction model, the domain-specific prediction model may be used to predict a solution for a user request.

As an example, the request management subsystem 116 may obtain a new user request (e.g., via a messaging interface) from the user 124. The request management subsystem 116 processes the user request (e.g., changing to lowercase, stemming, removing stop words, etc.) and generates a frequency-based vector representation for the user request. The request management subsystem 116 determines the content domain with which the user request is associated (e.g., from the messaging interface), and provides the vector representation of the user request as an input to the domain-specific prediction model associated with the content domain to obtain prediction data related to a solution to the user request. In some embodiments, the prediction may be associated with a confidence score, and the request management subsystem 116 may present the solution to the user based on the confidence score satisfying a threshold score.

Example Flowchart(s)

The example flowchart(s) described herein of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

Figure 4:
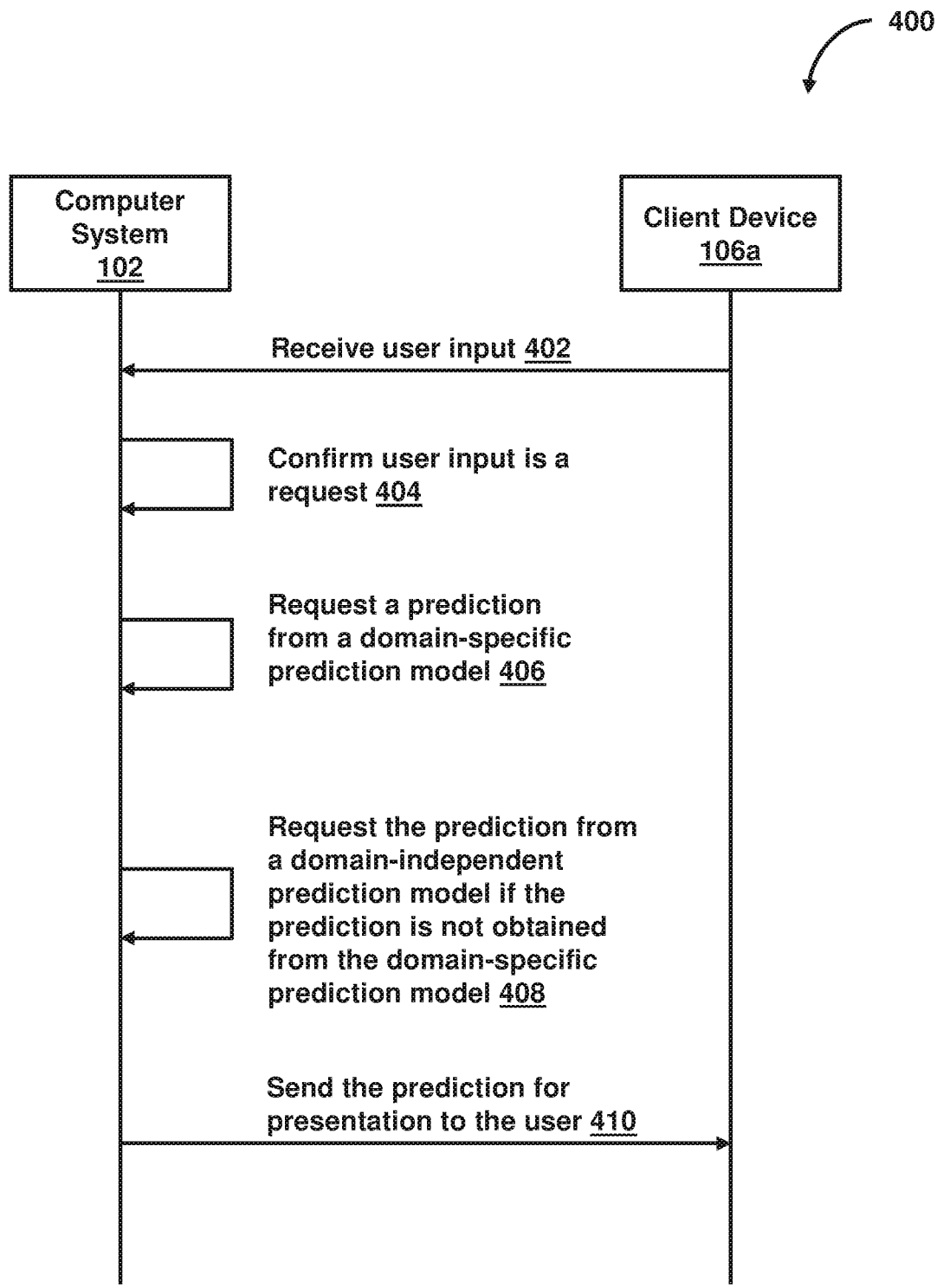
FIG. 4 shows a sequence of operations for generating a prediction of a solution to a user request, in accordance with one or more embodiments.

FIG. 4 shows a sequence 400 of operations for generating a prediction of a solution to a user request, in accordance with one or more embodiments. For example, sequence 400 may comprise steps performed by an improved processing architecture in networked computer systems. In particular, sequence 400 may include a new function routine that facilitates prediction of a solution to a user request. In an operation 402, the computer system 102 receives a user input from an application. The user input may be obtained via an application such as a chatbot or another application from which a user (e.g., user 124) may input a user request. For example, the user input may be received via a messaging interface that is used by the user to exchange messages with another user or another entity.

In an operation 404, the computer system 102 confirms the user input is indicative of a request. In some embodiments, the user input received in the messaging interface may be a conversation/statement between two users and not a request (e.g., a question) in which case the computer system 102 may avoid executing a prediction model to obtain the solution. Based on a confirmation that the user input is a request, the computer system 102 may automatically obtain the solution from a prediction model (e.g., a domain-specific prediction model or a domain-independent prediction model as illustrated below).

In some embodiments, the computer system 102 may use a third prediction model to determine whether the user input is indicative of a request. The model subsystem 118 may train the third prediction model to determine whether textual data (e.g., one or more words) is a request or a statement. The model subsystem 118 may obtain textual data from the data storage system and input them to the third prediction model as training information to generate prediction data related to a classification of the text a request or statement). As an example, the training information may include messages exchanged between users or posted by users in the messaging interface, or other such textual data. The third prediction model may generate prediction data related to the classification based on the above training information. For example, the prediction data may include a classification indicating the textual data is a statement. Feedback subsystem 120 may provide actual information such as whether the textual data in the training information is a statement or request as reference feedback to the third prediction model. As an example, the reference feedback may indicate that the textual data is a request. The model subsystem 118 may update one or more portions of the third prediction model based on the prediction data and the reference feedback information. In this way, for example, the third prediction model may be trained or configured to generate a prediction related to classification of a user input. As such, in some embodiments, subsequent to the updating of the third prediction model, computer system 102 may use the third prediction model to classify a user input as a statement or request. As an example, the computer system 102 may provide the user input as input to the third prediction model to obtain a classification of the user input as a request.

In an operation 406, responsive to a determination that the user input is a request, a domain-specific prediction model is requested to generate a prediction of a solution to the user request. Additional details of obtaining a prediction from the domain-specific prediction model is described at least with reference to FIG. 1 above and FIG. 5 below.

In an operation 408, responsive to a determination that a prediction of the solution is not obtained from the domain-specific prediction model, the domain-independent prediction model is requested to generate a prediction of the solution to the user request. Additional details of obtaining a prediction from the domain-independent prediction model is described at least with reference to FIG. 1 above and FIG. 6 below.

In an operation 410, the solution is presented to the user on the client device 106*a* (e.g., via the messaging interface).

Figure 5:
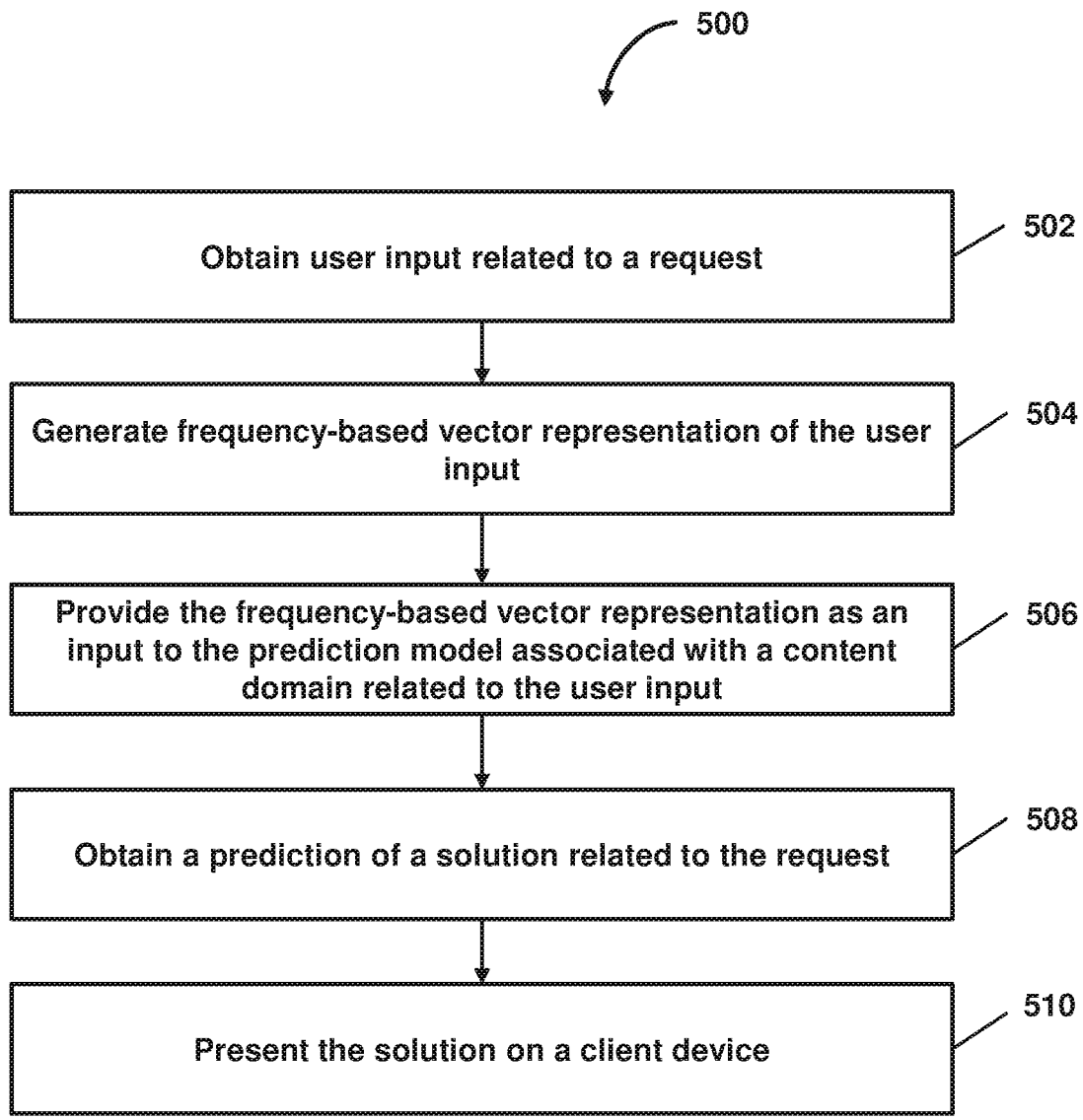
FIG. 5 shows a flowchart of a method for obtaining a prediction of a solution using a domain-specific prediction model, in accordance with one or more embodiments.

FIG. 5 shows a flowchart of a method 500 for obtaining a prediction of a solution using a domain-specific prediction model, in accordance with one or more embodiments. In some embodiments, the method 500 may be implemented as part of operation 406 of sequence 400. In an operation 502, a user input may be obtained from a user (e.g., via a messaging interface of a messaging application, or another application). For example, the user input (e.g., textual data) may be indicative of a request.

Operation 502 may be performed by a component that is the same as or similar to the request management subsystem 116, in accordance with one or more embodiments.

In an operation 504, a frequency-based vector representation may be generated for the user request. For example, the vector representation may be generated using a TF-IDF method or another method. In some embodiments, the user input may be processed to normalize the text prior to the generation of the vector representation. For example, normalization may include operations such as changing the user input to lowercase, stemming a word to its word stem, removing stop words (e.g., "the," "is" or other such words), or other such operation.

Operation 504 may be performed by a component that is the same as or similar to the request management subsystem 116, in accordance with one or more embodiments.

In an operation 506, the vector representation of the user request is provided as an input to a domain-specific prediction model associated with a content domain to which the request is related. The content domain with which the user request is associated may be determined in various ways. For example, the messaging interface which obtained the user input from the user may indicate the content domain with which the user input is associated. In another example, the user input itself may indicate the content domain. In still another example, an application which obtains the user input from the user may indicate the content domain. Once the content domain is identified, a do main-specific prediction model associated with the content is obtained and the vector representation of the user request is provided as an input to obtain prediction data related to a solution to the user request.

Operation 506 may be performed by a component that is the same as, or similar to, the request management subsystem 116, in accordance with one or more embodiments.

In an operation 508, prediction data related to a solution to the user request is obtained from the domain-specific prediction model. Operation 508 may be performed by a component that is the same as or similar to the request management subsystem 116, in accordance with one or more embodiments.

In an operation 510, the solution may be presented to the user on a client device associated with the user (e.g., via a messaging interface). In some embodiments, the prediction data may be associated with a confidence score, and the solution may be presented to the user based on the confidence score satisfying a threshold score (e.g., greater than 90%).

Operation 510 may be performed by a component that is the same as, or similar to, the request management subsystem 116, in accordance with one or more embodiments.

Figure 6:
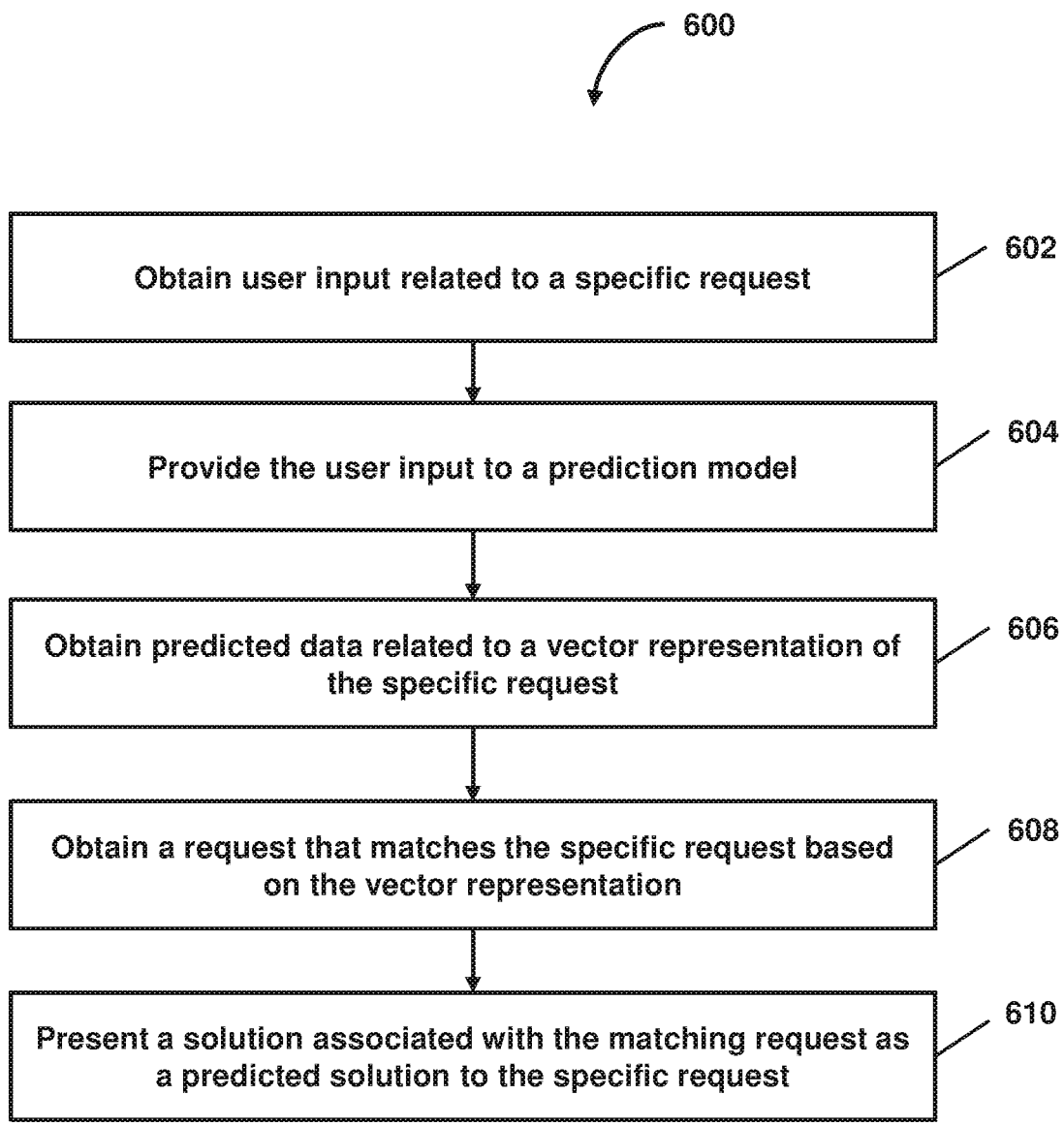
FIG. 6 shows a flowchart of a method for obtaining a prediction of a solution using a domain-independent prediction model, in accordance with one or more embodiments.

FIG. 6 shows a flowchart of a method 600 for obtaining a prediction of a solution using a domain-independent prediction model, in accordance with one or more embodiments. In some embodiments, the method 600 may be implemented as part of operation 408 of sequence 400. In an operation 602, a user input is obtained from a user. The user input may be indicative of a specific request for which a prediction of a solution is to be obtained. The user input may be obtained via a messaging interface of a chatbot or another application using which the user may input the user request.

Operation 602 may be performed by a component that is the same as, or similar to, the request management subsystem 116, in accordance with one or more embodiments.

In an operation 604, the user request is provided as an input to a prediction model (e.g., the fine-tuned first prediction model or the domain-independent prediction model) to obtain prediction data related to a vector representation of the user request.

Operation 604 may be performed by a component that is the same as, or similar to, the request management subsystem 116, in accordance with one or more embodiments.

In an operation 606, a vector representation of the user request is obtained from the first domain-independent prediction model. In some embodiments, the vector representation is a context-based vector representation of the user request, and is generated by the prediction model based on the context learnt from the datasets of the multiple content domains (e.g., as described at least with reference to FIG. 1 above or FIG. 7 below).

Operation 606 may be performed by a component that is the same as, or similar to, the request management subsystem 116, in accordance with one or more embodiments.

In an operation 608, a request that matches the vector representation of a user request is obtained from the database 132. In some embodiments, the matching request is obtained by comparing the vector representation of the user request with vector representations of the requests stored in the database 132 (e.g., requests of the content domains 305), and identifying a request whose similarity score satisfies a threshold (e.g., greater than 90% or other threshold) as the matching request. The similarity score may be determined in various ways. For example, the similarity score may be determined using a cosine distance.

Operation 608 may be performed by a component that is the same as, or similar to, the request management subsystem 116, in accordance with one or more embodiments.

In an operation 610, a solution associated with the matching request is obtained and presented to the user (e.g., via the messaging interface). For example, if the request "R1$_{a2}$?" from "Group$_{a2}$" (illustrated in FIG. 3) is determined as the matching request, the solution "S1$_{a2}$" associated with the group, "Group$_{a2}$," is obtained as the solution.

Operation 610 may be performed by a component that is the same as, or similar to, the request management subsystem 116, in accordance with one or more embodiments.

Referring to operation 608, in some embodiments, a specified number of requests with similarity scores satisfying a threshold (e.g., top three requests) may be obtained as matching requests and presented to the user (e.g., via the messaging interface) for user selection of a request. Upon receiving a user selection of a request, a solution associated with the selected request is obtained and presented to the user.

Further, in some embodiments, the matching requests presented for user selection may be selected from a content domain with which the user request is associated. For example, if the user request is associated with the first content domain, "Domain$_a$," (e.g., which may be indicated by the messaging interface or another application that is used b the user to provide the user input), then the matching requests (e.g., top three requests) may be selected from the groups of the first content domain.

Figure 7:
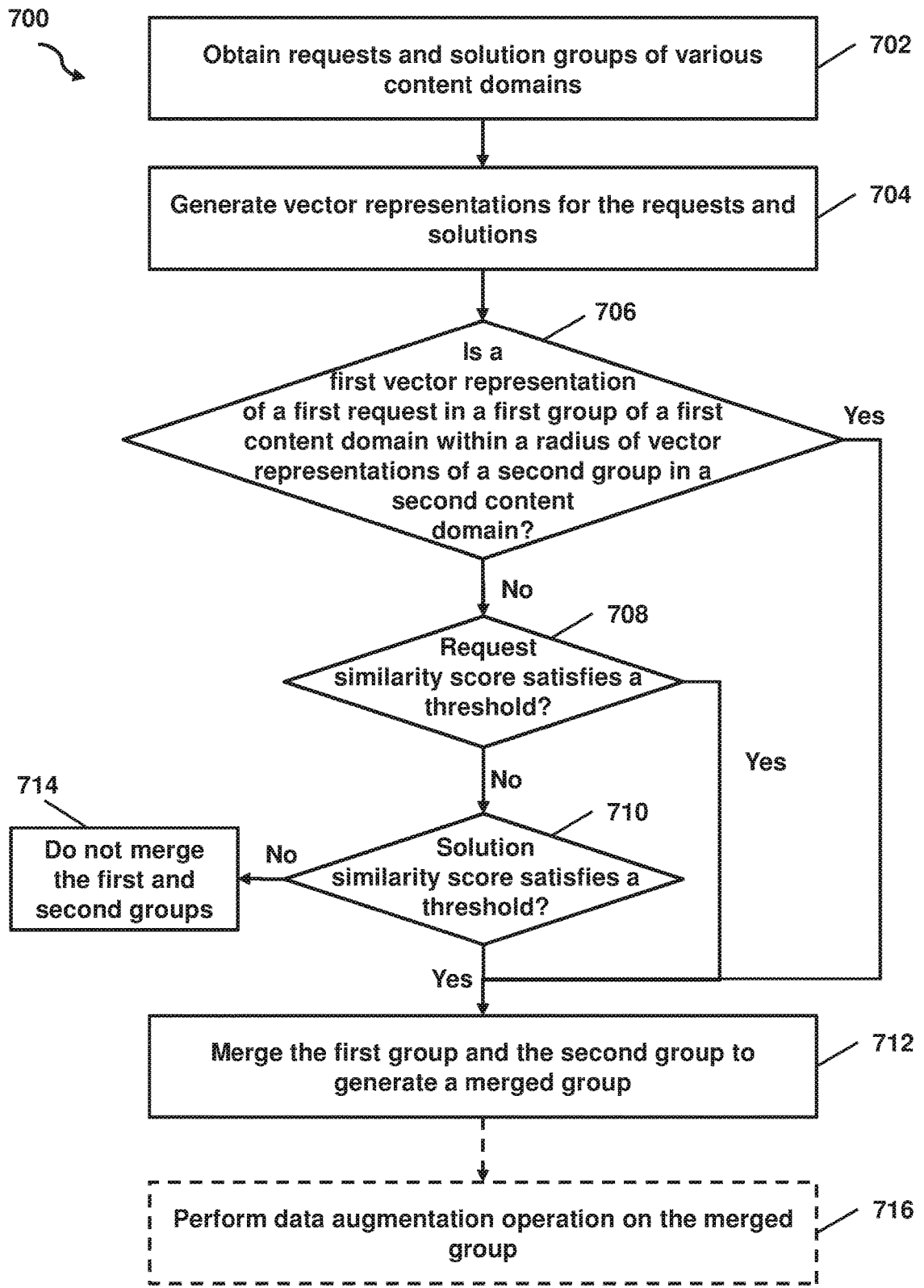
FIG. 7 shows a flowchart of a method for merging request and solutions from various content domains to train a domain-independent prediction model, in accordance with one or more embodiments.

FIG. 7 shows a flowchart of a method 700 for merging requests and solutions from various content domains to train a domain-independent prediction model, in accordance with one or more embodiments. In an operation 702, datasets having groups of requests and solutions of various content domains 305 are obtained. The datasets may be obtained from the database 132. For example, a first dataset associated with a first content domain, "Domain$_a$," may include multiple groups of requests and solutions, such as "Group$_{a1}$," "Group$_{a2}$," "Group$_{a3}$," and so on in which each group is related to a specific aspect, topic, or another characteristic of the first content domain. A group may include a set of requests (e.g., questions), such as, "Request1$_{a1}$," "Request2$_{a1}$," "Request3$_{a1}$," etc. associated with the specific aspect, and a solution, such as "Solution1$_{a1}$," associated with the set of requests.

In an operation 704, context-based vector representations are generated for the requests and solutions. A context-based vector representation may be generated using any of a number of text encoders. For example, the first prediction model, such as SBERT, may be used to generate a vector representation for a request or a solution. The first prediction model may be pre-trained using a wide variety of content (e.g., corpora of textual content available from the Internet, such as Wikipedia, books, or other such content) so that a vector representation generated by the pre-trained first prediction model for a given word or words is a representation of a context of the given word or words within the English language, not just within a content domain's dataset. The datasets of the content domains 305 are input to the first prediction model to obtain vector representations of the requests and solutions.

After the vector representations are generated, the groups from different content domains may be merged based on the merging criteria, as illustrated in operations 706-710. In an operation 706, a determination is made whether a vector representation of a request in a first group from a first content domain is within a radius of vector representations of requests in a second group from a second content domain. For example, a determination is made whether a request in the first group, "Group$_{a1}$," of the first content domain is within the radius of the second group, "Group$_{b2}$," of the second content domain.

Based on the determination that none of the requests in the first group are within the radius of the second group, in an operation 708, a determination is made whether a request similarity score that is indicative of a similarity or match between a first vector representation of a first request in the first group and a second vector representation of a second request in the second group satisfies a request similarity threshold score. For example, a similarity score that is indicative of a match or similarity between a vector representation of each request in the first group, "Group$_{a1}$," of the first content domain and a vector representation of each request in the second group, "Group$_{b2}$," of the second content domain (e.g., using cosine distance) may be determined.

Based on the determination that the similarity score of any of the requests not satisfying the request similarity threshold score, in an operation 710, a determination is made whether a solution similarity score that is indicative of a similarity or match between a first vector representation of a first solution in the first group and a second vector representation of a second solution in the second group satisfies a solution similarity threshold score. For example, a similarity score that is indicative of a match or similarity between a vector representation of a solution in the first group, "Group$_{a1}$," of the first content domain and a vector representation of a solution in the second group, "Group$_{b2}$," of the second content domain (e.g., using cosine distance) may be determined.

Based on the determination that the similarity score of the solutions not satisfying the solution similarity threshold score, in an operation 714, the first group and the second group are retained as separate groups (e.g., groups are not merged).

If any of the conditions in operations 706-710 is satisfied, in an operation 712, the first group and the second group are merged to form a merged group. For example, the first group, "Group$_{a1}$," of the first content domain, "Domain$_a$," and with the second group, "Group$_{b2}$," of the second content domain, "Domain$_a$" are merged to form a first merged group, "Merged Group$_1$," of the merged groups 325.

The operations 706-714 are performed all groups across the content domains 305.

After the merged groups are generated, additional operations, such as data augmentation, may be performed on the merged groups 325 to enhance the merged group with additional requests or solutions. In an operation 716, data augmentation operation may be performed to augment a merged group with an additional request or solution. The data augmentation operation may generate a new request or solution by (a) replacing one or more words in an existing request with synonyms, (b) removing one or more words from an existing request, (c) adding one or more synonyms to an existing request, (d) swapping words in a request, or other such operations. Further, the data augmentation may be performed based on augmentation criteria. For example, augmentation criteria may indicate the data augmentation is to be performed if a number of requests or solutions in a merged group (e.g., generated in operation 712) is below a specified threshold (e.g., less than 10). In some embodiments, the data augmentation is performed to provide additional context information for fine tuning the first prediction model to generate vector representations more accurately.

Operations 702-716 may be performed by a component at is the same as or similar to the data management subsystem 112, in accordance with one or more embodiments.

In some embodiments, the various computers and subsystems illustrated in FIG. 1 may include one or more computing devices that are programmed to perform the functions described herein. The computing devices may include one or more electronic storages (e.g., prediction database(s) 132, or other electronic storages), one or more physical processors programmed with one or more computer program instructions, and/or other components. The computing devices may include communication lines or ports to enable the exchange of information within a network (e.g., network 150) or other computing platforms via wired or wireless techniques Ethernet, fiber optics, coaxial cable, Wi-Fi, Bluetooth, near field communication, or other technologies). The computing devices may include a plurality of hardware, software, and/or firmware components operating together. For example, the computing devices may be implemented by a cloud of computing platforms operating together as the computing devices. Cloud components may include control circuitry configured to perform the various operations needed to implement the disclosed embodiments. Cloud components may include cloud-based storage circuitry configured to electronically store information. Cloud components may also include cloud-based input/output circuitry configured to display information.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-120 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-120 described herein is for illustrative purposes, and is not intended to be limiting, as any of subsystems 112-120 may provide more or less functionality than is described. For example, one or more of subsystems 112420 may be eliminated, and some or all of its functionality may be provided by other ones of subsystems 112-120. As another example, additional subsystems may be programmed to perform some or all of the functionality attributed herein to one of subsystems 112-120.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:
1. A method comprising: obtaining vector representations of requests and solutions associated with multiple content domains, wherein the requests and solutions are stored as multiple groups, wherein the groups include (a) a first set of groups comprising requests and solutions related to a first content domain of the content domains and (b) a second set of groups comprising requests and solutions related to a second content domain of the content domains; merging the groups based on a relationship between vector representations of requests or solutions in different content domains to generate multiple merged groups, wherein the multiple merged groups include a first merged group that is generated by merging a first group of the first set of groups with a second group of the second set of groups; and providing the merged groups as training data to a first prediction model, wherein the first prediction model is used to generate prediction data related to a solution for a user request.

2. The method of any of the preceding embodiments, further comprising: providing a user input obtained from a client device associated with a user to the first prediction model; obtain a prediction of a solution for the user input; and presenting the solution to the user on the client device.

3. The method of any of the preceding embodiments, wherein obtaining the prediction data related to the solution includes: obtaining, via the first prediction model, a prediction of a first vector representation of the user input; obtaining, from a data storage system, a first request that matches the user input based on a second vector representation of the first request matching the first vector representation; and obtaining a specified solution associated with the first request as the solution.

4. The method of embodiment 3, wherein obtaining the first request includes: obtaining a set of requests matching the user input based on a match score satisfying a threshold score, wherein the match score is indicative of a match between a set of vector representations of the set of requests and the first vector representation; and providing the set of requests to the client device for presentation to the user.

5. The method of embodiment 4, further comprising: obtaining a user selection of the first request from the set of requests.

6. The method of embodiment 4, the set of requests are obtained from a content domain of the content domains with which the user input is associated.

7. The method of any of the preceding embodiments, wherein the first group and the second group are merged based on a first vector representation of a first request in the first group being within a radius of vector representations of requests in the second group.

8. The method of embodiment 7, wherein the radius is determined by: obtaining a centroid of the vector representations of the requests in the second group; determining a distance between the centroid and each vector representation of the vector representations, wherein the radius is a least distance of the distances.

9. The method of any one of the preceding embodiments, wherein the first group and the second group are merged based on a request similarity score satisfying a threshold score, wherein the request similarity score is indicative of a match between a first vector representation of a first request in the first group and a second vector representation of a second request in the second group.

10. The method of any one of the preceding embodiments, wherein the first group and the second group are merged based on a solution similarity score satisfying a threshold score, the solution similarity score being indicative of a match between a first vector representation of a first solution in the first group and a second vector representation of a second solution in the second group.

11. The method of any one of the preceding embodiments, further comprising: performing a data augmentation operation on the first merged group to insert an additional set of requests or solutions that match with requests or solutions in the first merged group.

12. The method of embodiment 11, wherein the data augmentation operation is performed based on a number of requests or solutions in the first merged group satisfying a threshold number.

13. The method of embodiment 2, wherein providing the user input to the first prediction model includes: providing the user input to a second prediction model to obtain a prediction whether the user input is indicative of a request or a statement; and providing the user input to the first prediction model based on the prediction indicating that user input is indicative of the request.

14. The method of embodiment 2, wherein providing the user input to the first prediction model includes: generating a first weight associated the user input, wherein the first weight is generated based on a frequency of occurrence of terms in the user input relative to the frequency of occurrence of the terms in the first content domain; and providing the first weight to a third prediction model to obtain a first prediction of the solution.

15. The method of embodiment 14, wherein the first prediction is associated a confidence score, and wherein the solution is presented to the client device based on the confidence score satisfying a threshold score.

16. The method of embodiment 15, wherein the user input is provided to the first prediction model based on the confidence score not satisfying the threshold score.

17. The method of any one of the preceding embodiments, wherein the first condition includes a first parameter that indicates an expected value of at least one of the request parameters.

18. A tangible, non-transitory, machine-readable medium storing instructions that, when executed by a data processing apparatus, cause the data processing apparatus to perform operations comprising those of any of embodiments 1-17.

19. A system comprising: one or more processors; and memory storing instructions that, when executed by the processors, cause the processors to effectuate operations comprising those of any of embodiments 1-17.

20. A system comprising means for performing any of embodiments 1-17.

What is claimed is:

1. A system for improving prediction model accuracy by training the prediction model for a specific content domain based on aggregated training data from disparate content domains, the system comprising:

one or more processors and non-transitory computer readable media comprising instructions that, when executed by the one or more processors, cause operations comprising:
in connection with fine-tuning a prediction model for a first content domain of multiple content domains, obtaining (i) a first query group comprising first query and answer vector representations of first queries and corresponding first answers related to the first content domain and (ii) a second query group comprising second query and answer vector representations of second queries and corresponding second answers related to a second content domain of the multiple content domains that is different from the first content domain;

supplementing the first query and answer vector representations related to the first content domain with at least a subset of the second query and answer vector representations related to the second content domain based on a determination that the second query and answer vector representations of the subset are respectively similar to the first query and answer vector representations related to the first content domain in accordance with a similarity criteria to generate an aggregated query group to fine-tune the prediction model for the first content domain;

providing the aggregated query group as training data to the prediction model to obtain a fine-tuned prediction model for the first content domain that generates matching vector representations for queries within the aggregated query group;

providing a user input, obtained via a messaging interface that is indicative of a query related to the first content domain, to the fine-tuned prediction model to obtain a predicted answer, wherein the predicted answer is determined based on an answer corresponding to at least one the queries in the aggregated query group whose vector representation matches a vector representation of the user input; and generating for display, via the messaging interface, on a local display device, the predicted answer.

2. A method for improving prediction model accuracy by training a prediction model for a specific content domain based on aggregated training data from disparate content domains, the method comprising:

obtaining vector representations of requests and solutions of (i) a first group of requests and solutions related to a first content domain and (ii) a second group of requests and solutions related to a second content domain, the second content domain being different from the first content domain;

supplementing the requests and solutions of the first group with at least a subset of the requests and solutions of the second group based on similarity criteria between (i) a first set of vector representations of requests and a first solution to the requests in the first group and (ii) a second set of vector representations of requests and a second solution to the requests in the second group to generate an aggregated group of requests and solutions;

providing the aggregated group of requests and solutions as training data to a first prediction model to cause the first prediction model to generate matching vector representations for requests within the aggregated group of requests and solutions;

providing a user input, obtained from a client device associated with a user, to the first prediction model to obtain a prediction of a solution for the user input; and generating for display, the solution to the user on the client device.

3. The method of claim 2, wherein supplementing the requests and solutions of the first group with the subset of the requests and solutions of the second group based on the similarity criteria includes:

supplementing the requests and solutions of the first group with the subset of the requests and solutions of the second group based on a first vector representation of a first request in the first group being within a radius of the second set of vector representations of the second group.

4. The method of claim 3, further comprising:

obtaining a centroid of the second set of vector representations of the second group;

determining a distance between the centroid and each vector representation of the second set of vector representations, wherein the radius is the least distance of the distances;

determining a second distance between the first vector representation and the centroid as being lesser than the radius; and supplementing the requests and solutions of the first group with the subset of requests and solutions of the second group further based on the second distance between the first vector representation and the centroid being lesser than the radius, where the subset of requests and solutions of the second group are all of the requests and solutions part of the second group.

5. The method of claim 2, wherein supplementing the requests and solutions of the first group with the subset of the requests and solutions of the second group based on the similarity criteria includes:

supplementing the requests and solutions of the first group with the subset of the requests and solutions of the second group based on the similarity criteria includes supplementing the requests and solutions of the first group with the subset of the requests and solutions of the second group based on a first score satisfying a first threshold score, wherein the first score is indicative of a match between a first vector representation of a first request the first group and a second vector representation of a second request in the second group.

6. The method of claim 2, wherein supplementing the requests and solutions of the first group with the subset of the requests and solutions of the second group based on the similarity criteria includes:

supplementing the requests and solutions of the first group with the subset of the requests and solutions of the second group based on a second score satisfying a second threshold score, wherein the second score is indicative of a match between a third vector representation of the first solution and a fourth vector representation of the second solution.

7. The method of claim 2, further comprising:

performing a data augmentation operation on the aggregated group of requests and solutions to insert an additional set of requests or solutions that match with the requests or solutions in the aggregated group of requests and solutions.

8. The method of claim 7, wherein the data augmentation operation is performed based on a number of requests or solutions in the aggregated group of requests and solutions satisfying an augmentation threshold.

9. The method of claim 2, wherein providing the user input to the first prediction model further comprises:

providing the user input to a second prediction model to obtain a second prediction that the user input is indicative of a request related to the first content domain; and providing the user input related to the first content domain to the first prediction model based on the user input being indicative of the request being related to the first content domain.

10. The method of claim 2, wherein providing the user input to the first prediction model further comprises:

obtaining, via the first prediction model, a prediction of a first vector representation of the user input;

obtaining, from a data storage system, a first request that matches the user input based on a second vector representation of the first request matching the first vector representation, wherein the first request is one of multiple requests of multiple content domains, and wherein the data storage system is configured to store vector representations of the requests of the multiple content domains; and obtaining, from the data storage system, a specified solution associated with the first request as the solution.

11. The method of claim 10, wherein the first request is obtained from the aggregated group of requests and solutions based on the user input being from the first content domain.

12. The method of claim 10, wherein obtaining the first request further comprises:

obtaining, from the data storage system, a set of requests from the multiple content domains matching the user input based on a match score satisfying a threshold score, wherein the match score is indicative of a match between a set of vector representations of the set of requests and the first vector representation; and providing the set of requests to the client device for obtaining a user selection of the first request from the set of requests.

13. The method of claim 2, further comprising:

generating a first weight associated the user input, wherein the first weight is generated based on a frequency of occurrence of terms in the user input relative to that in the first content domain; and providing the first weight to the first prediction model to obtain the prediction of the solution.

14. One or more non-transitory computer-readable media, comprising instructions that, when executed by one or more processors, cause operations comprising:

obtaining vector representations of requests and solutions of (i) a first group of requests and solutions related to a first content domain and (ii) a second group of requests and solutions related to a second content domain, the second content domain being different from the first content domain;

supplementing the requests and solutions of the first group with at least a subset of the requests and solutions of the second group based on similarity criteria between (i) a first set of vector representations of requests and a first solution to the requests in the first group and (ii) a second set of vector representations of requests and a second solution to the requests in the second group to generate an aggregated group of requests and solutions;

providing the aggregated group of requests and solutions as training data to a first prediction model to cause the first prediction model to generate matching vector representations for requests within the aggregated group of requests and solutions;

providing a user input, obtained from a client device associated with a user, to the first prediction model to obtain a prediction of a solution for the user input; and generating for display, the solution to the user on the client device.

15. The media of claim 14, wherein supplementing the requests and solutions of the first group with the subset of the requests and solutions of the second group based on the similarity criteria includes:

supplementing the requests and solutions of the first group with the subset of the requests and solutions of the second group based on a first vector representation of a first request in the first group being within a radius of the second set of vector representations of the second group.

16. The media of claim 15, wherein further comprising:

obtaining a centroid of the second set of vector representations of the second group;

determining a distance between the centroid and each vector representation of the second set of vector representations, wherein the radius is the least distance of the distances;

determining a second distance between the first vector representation and the centroid as being lesser than the radius; and supplementing the requests and solutions of the first group with the subset of requests and solutions of the second group further based on the second distance between the first vector representation and the centroid being lesser than the radius, where the subset of requests and solutions of the second group are all of the requests and solutions part of the second group.

17. The media of claim 14, wherein supplementing the requests and solutions of the first group with the subset of the requests and solutions of the second group based on the similarity criteria includes:

supplementing the requests and solutions of the first group with the subset of the requests and solutions of the second group based on a first score satisfying a first threshold score, wherein the first score is indicative of a match between a first vector representation of a first request the first group and a second vector representation of a second request in the second group.

18. The media of claim 14, wherein supplementing the requests and solutions of the first group with the subset of the requests and solutions of the second group based on the similarity criteria includes:

supplementing the requests and solutions of the first group with the subset of the requests and solutions of the second group based on a second score satisfying a second threshold score, wherein the second score is indicative of a match between a third vector representation of the first solution and a fourth vector representation of the second solution.

19. The media of claim 14, wherein the instructions, when executed by the one or more processors, cause operations further comprising:

performing a data augmentation operation on the aggregated group of requests and solutions to insert an additional set of requests or solutions that match with the requests or solutions in the aggregated group of requests and solutions.

20. The media of claim 14, wherein the instructions that, when executed by the one or more processors, cause operations further comprising:

generating a first weight associated the user input, wherein the first weight is generated based on a frequency of occurrence of terms in the user input relative to that in the first content domain; and providing the first weight to the first prediction model to obtain the prediction of the solution.

* * * * *